United States Patent
Hoeg et al.

(10) Patent No.: US 10,443,456 B2
(45) Date of Patent: Oct. 15, 2019

(54) EXHAUST VALVE FOR AN INTERNAL COMBUSTION ENGINE, AND A METHOD OF STRENGTHENING AN ANNULAR VALVE SEAT AREA IN AN EXHAUST VALVE

(71) Applicant: MAN Diesel & Turbo, Filial af MAN Diesel & Turbo SE, Tyskland, Copenhagen SV (DK)

(72) Inventors: Harro Andreas Hoeg, Allerød (DK); Christian Skaaning, Copenhagen (DK)

(73) Assignee: MAN DIESEL & TURBO, FILIAL AF MAN DIESEL & TURBO SE. TYSKLAND, Copenhagen SV (DK)

( * ) Notice: Subject to any disclaimer, the term of this patent is extended or adjusted under 35 U.S.C. 154(b) by 0 days.

(21) Appl. No.: 16/030,252

(22) Filed: Jul. 9, 2018

(65) Prior Publication Data

US 2018/0313238 A1    Nov. 1, 2018

Related U.S. Application Data (63) Continuation of application No. 14/678,057, filed on Apr. 3, 2015, now abandoned.

(30) Foreign Application Priority Data

Apr. 8, 2014    (DK) .................................. 2014 70184

(51) Int. Cl.
*F01L 3/04*    (2006.01)
*F01L 3/02*    (2006.01)
(Continued)

(52) U.S. Cl.
CPC .................. *F01L 3/02* (2013.01); *C21D 1/18* (2013.01); *C22C 19/058* (2013.01); *C22C 38/00* (2013.01);
(Continued)

(58) Field of Classification Search
CPC . F01L 3/02; F01L 2103/00; F01L 3/04; F01L 2103/01; F01L 35/02; C22C 38/00;
(Continued)

(56) References Cited

U.S. PATENT DOCUMENTS 2,392,152 A * 1/1946 Johnson ................... B21K 1/22
                                                  29/888.45
3,649,380 A * 3/1972 Tauschek ................. B21K 1/22
                                                   123/188.3
(Continued)

FOREIGN PATENT DOCUMENTS

EP        0204121 A1    12/1986

OTHER PUBLICATIONS

Danish Search Report of PA 2014 70184 dated Jul. 15, 2014.

*Primary Examiner* — Jun S Yoo
(74) *Attorney, Agent, or Firm* — Sughrue Mion, PLLC (57) ABSTRACT

An exhaust valve for an internal combustion engine comprises a valve disc having a first side (14) and a second side (16), a valve stem extending from the first side of the valve disc, and an annular valve seat area (11) located at the first side of the valve disc. The annular valve seat area (11) is of a nickel-base alloy or a chromium-base alloy and has a valve seat surface. The annular valve seat area has at least a first annular portion (43) located in between two second annular portions (42). The first annular portion has lower hardness than the two second annular portions.

5 Claims, 6 Drawing Sheets

(51) Int. Cl.
 *C21D 1/18* (2006.01)
 *C22C 19/05* (2006.01)
 *C22C 38/00* (2006.01)
 *B21K 1/22* (2006.01)
 *B23P 15/00* (2006.01)
(52) U.S. Cl.
 CPC ............... *B21K 1/22* (2013.01); *B23P 15/002* (2013.01); *F01L 2103/00* (2013.01)
(58) Field of Classification Search
 CPC ....... C22C 19/058; C21D 1/18; B23P 15/002; B23P 9/02; B23P 9/04; B21K 1/22
 See application file for complete search history.

(56) References Cited

U.S. PATENT DOCUMENTS

| | | |
|---|---|---|
| 4,075,999 A | 2/1978 | Danis |
| 4,122,817 A | 10/1978 | Matlock |
| 4,161,414 A | 7/1979 | Saint-Prix |
| 4,530,322 A | 7/1985 | Yamada et al. |
| 6,244,234 B1 | 6/2001 | Hoeg |
| 6,295,731 B1 | 10/2001 | Yamakawa et al. |
| 6,298,817 B1 | 10/2001 | Hoeg |
| 6,378,543 B1 | 4/2002 | Murayama |
| 6,385,847 B1 | 5/2002 | Larson et al. |
| 6,443,115 B1 | 9/2002 | Hoeg |
| 7,562,647 B2 | 7/2009 | Burton et al. |
| 2002/0064678 A1 | 5/2002 | Kiyotoki et al. |
| 2010/0108012 A1 | 5/2010 | Beerens et al. |
| 2011/0030642 A1* | 2/2011 | Nishida ................ F01L 3/00 123/188.2 |
| 2011/0209468 A1* | 9/2011 | Hoeg ................ B22F 3/15 60/324 |
| 2014/0008562 A1* | 1/2014 | Bihlet ................ F01L 3/04 251/368 |
| 2014/0191150 A1* | 7/2014 | Mikami ................ B21K 1/22 251/333 |

* cited by examiner

Fig. 12

EXHAUST VALVE FOR AN INTERNAL COMBUSTION ENGINE, AND A METHOD OF STRENGTHENING AN ANNULAR VALVE SEAT AREA IN AN EXHAUST VALVE

CROSS-REFERENCE TO RELATED APPLICATIONS

This is a continuation application of U.S. patent application Ser. No. 14/678,057, filed Apr. 3, 2015, which claims priority based on Danish Patent Application No. PA 2014 70184 filed on Apr. 8, 2014, the contents of all of which are incorporated herein by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to an exhaust valve for an internal combustion engine, the exhaust valve comprising a valve disc having a first side and a second side, a valve stem extending from the first side of the valve disc, and an annular valve seat area located at the first side of the valve disc, which annular valve seat area is of a nickel-base alloy or a chromium-base alloy and has a valve seat surface.

Such an exhaust valve is disclosed in U.S. Pat. No. 6,295,731 where a valve blank has a valve disc of smaller diameter than the disc of the completed valve and excess material above the valve seat. The excess material is shaped as an isosceles-triangle-sectioned lobe on the valve disc covering the complete area of the valve seat. The valve blank is heated to a temperature of 530 to 600° C. and is forged in a die having the shape of the completed valve disc. During forging the isosceles-triangle-sectioned lobe is plastically deformed and the outer diameter of the valve disc is increased. The forging of the excess material thus causes plastic flow of all the material at the outer area of the valve disc.

EP 0 521 821 B1 discloses an exhaust valve comprising a valve disc having a first side provided with an extending valve stem and an annular valve seat area with a valve seat surface. The annular valve seat area is of a nickel-base alloy or a chromium-base alloy. Forging may be used to globally shape the valve seat area. Hot deformation is recommended in order to distribute carbide formations within the material in order to obtain improved corrosion resistance.

The book 'Diesel engine combustion chamber materials for heavy fuel operation' published in 1990 by The Institute of Marine Engineers, London, collected the experience gained from the whole industry and provided the general conclusion that the valve seat area of an exhaust valve must have high hardness.

WO 97/47862 discloses an exhaust valve disc having a base body of austenitic stainless steel and a valve seat area of a nickel-base material provided by welding or by a HIP process. The yield strength of the valve seat area may be increased by cold-working of the material, such as by rolling or forging the valve seat area.

BRIEF SUMMARY OF THE INVENTION

It is an object of the present invention to improve the manufacturing of the valve seat area.

With a view to this, the initially mentioned exhaust valve according to the present invention is characterized in that the annular valve seat area has at least a first annular portion located in between two second annular portions, which first annular portion has lower hardness than the two second annular portions.

The first annular portion of lower hardness has higher ductility than the two second annular portions, and the location of the first annular portion in between the two second annular portions in the valve seat area allows elastic valve seat deformation to occur more in the first annular portion than in the second annular portions. The harder and less ductile second annular portions may thus be less affected by loads caused by temperature changes when the engine initiates operation or is taken out of operation or is significantly changing engine load. In particular for main propulsion engines in a vessel the engine is typically operated at almost constant engine load—typically full engine load—for several or many days in a row while sailing across seas from one destination to another, and then operated at low engine load while the vessel approaches and enters a port. Such changes in load and resulting changes in operating temperatures affect the valve disc and the valve seat area. The valve seat area is part of the first side of the valve disc and is thus facing away from the combustion chamber in the engine cylinder. The valve seat area has a conical outer surface and due to the resulting changes in thickness of the valve disc at the valve seat area the loadings caused by thermal changes of the valve disc are of significance. The first annular portion in the valve seat area reduces the amount of high hardness alloy material in the valve seat area, as the high hardness alloy material is localised in the two second annular portions.

In the prior art exhaust valves the entire valve seat area is subjected to plastically deformation in order to improve the hardness or yield strength of the valve seat alloy. The first annular portion of lower hardness requires that plastic deformation is avoided, or not performed to the same extent as in the second annular portions. As less plastic deformation is required, the manufacturing of the valve seat area is facilitated and the plastic deformation carried out may be more precise because the volumes of material to be deformed are smaller.

In an embodiment the average hardness at the valve seat surface at the middle of the first annular portion is at least 80 HV lower than the average hardness at the middle of the surface of at least one of the second annular portions. Although advantages are obtained also at lower differences of average hardness, such as a difference of at least 50 HV, the difference of at least 80 HV provides a suitable ductility in the first annular portion.

In an embodiment the material of the two second annular portions has a crystallographic grain structure of cold deformation and age hardening below recrystallization temperature. The age hardening is not mandatory, but presents an advantageous manner of improving the hardness of the two second annular portions when the alloy of the valve seat area is capable of age hardening.

In a further embodiment the material of the first annular portion has a crystallographic grain structure without cold deformation. In this embodiment the ductility of the material of the first annular portion is about as high as possible for the given alloy and geometry of the valve seat area.

It is possible to make the entire valve disc of the same alloy as the alloy in the valve seat area. For exhaust valves having large dimensions, such as an outer diameter of the valve disc of 0.10 m or more, it may be an advantage to use a base body of one alloy and provide this base body with a valve seat area of another alloy. In an embodiment the valve disc carrying the annular valve seat area comprises a base body of stainless steel. The stainless steel provides suitably high strength and the stainless steel alloys are readily available.

In an embodiment the valve disc comprises at its second side a layer of a hot corrosion resistant material. The second side of the valve disc faces the combustion chamber and is thus subjected to high temperatures in operation and also to corrosive combustion residues adhering to the surface of the disc. The layer of hot corrosion resistant material may improve the life time of the exhaust valve.

In another aspect, the present invention relates to a method of strengthening an annular valve seat area in an exhaust valve for an internal combustion engine, which exhaust valve comprises a valve disc having a first side and a second side, a valve stem extending from the first side of the valve disc, and an annular valve seat area located at the first side of the valve disc.

In order to improve the manufacturing of the valve seat area, at least the following steps are performed according to the present invention:

a) a valve disc with a raw seat area is provided, which raw seat area has at least two annular protrusions separated by an intermediate annular area, b) the two annular protrusions are plastically deformed, c) the raw seat area is machined to the dimensions of the annular valve seat area, d) the valve disc with the annular valve seat area is subjected to heat treatment involving at least an aging heat treatment.

The separation of the two annular protrusions by the intermediate annular area reduces the area available for the annular protrusions, and they consequently have much less volume than the above-mentioned prior art lobe, and the deformation in step b) thus requires less forces. The deformation of the protrusions in step b) and the machining in step c) form the two second annular portions in the valve seat area, and the first annular portion is located in or formed by the intermediate annular area.

The smaller size of the two annular protrusions also reduces the need for excess material in the raw seat area, and the valve disc with the raw seat area can be shaped closer to the final dimensions of the valve disc and thus alloying material is saved and the need for machining in step c) is also reduced.

The plastic deformation can be effected by forging, but preferably the plastic deformation in step b) involves rolling with a cylindrically shaped roll. The cylindrically shaped roll is in contact with only a small portion of the annular protrusion at a time because the roll is arranged during rolling with its rotational axis extending in a direction approximately orthogonal to the circular path of the annular protrusion. It is a distinct advantage that the complete width of the annular protrusion is rolled simultaneously by the roll and that the roll extends to both sides of the annular protrusion because the plastically deformed material cannot just be pressed aside into a ridge but is pressed into the material of the valve seat area below the roll. It is possible to roll the raw seat area into the shape of the completed valve seat area and then perform the machining in step c) as a grinding.

As the annular protrusions are separated by the intermediate annular area the one annular protrusion is located at a larger distance from the stem than the other annular protrusion. It is naturally possible to use only a single roll for the annular protrusions and to roll both protrusions in a common rolling operation, or to roll the one protrusion first, and then roll the other protrusion. It is also possible to use a separate cylindrically shaped roll for each annular protrusion which allows the roll located at the larger distance to rotate at a slightly higher speed than the other roll.

When two rolls are used the separate cylindrically shaped rolls are preferably carried by a common rolling tool, but are allowed to rotate during rolling with mutually different rotational speeds.

The individual annular protrusion provided in step a) may have different shapes, such as a shape with a curved central portion. The top of the curve can be located at a radial position where the second annular portion should have the highest hardness.

BRIEF DESCRIPTION OF THE SEVERAL VIEWS OF THE DRAWING

Examples of embodiments will be described in further detail in the following with reference to the schematic drawings, on which

DETAILED DESCRIPTION OF THE INVENTION

When alloys are specified or alloying components mentioned in the present description, components are stated in percent by volume (vol-%) but only denoted %.

Figure 1:
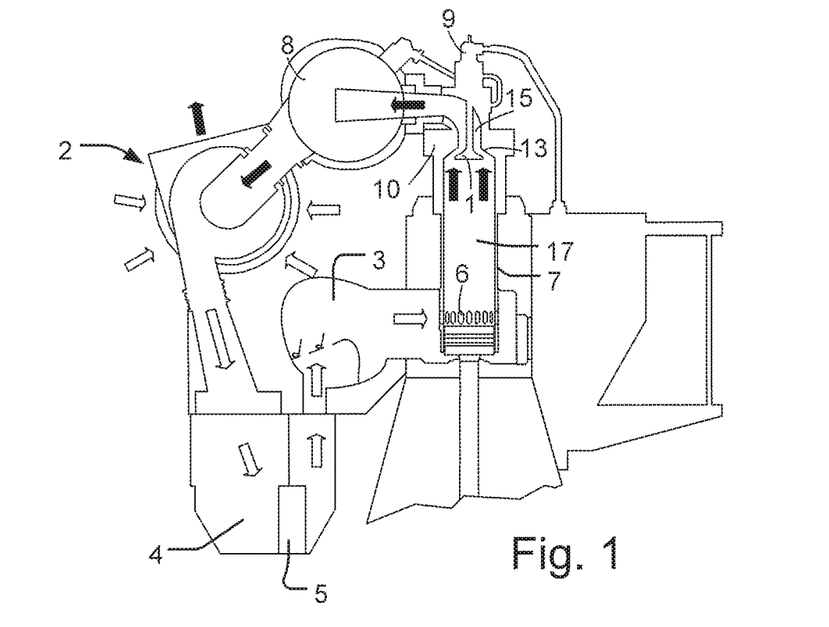
FIG. 1 illustrates a vertical section through a cylinder of an internal combustion engine.

An exhaust valve 1 is viewed in FIG. 1 in an open position allowing intake air to be supplied from a turbocharger 2 to a scavenge air receiver 3 via a scavenge air cooler 4 and a water mist catcher 5. The intake and scavenge air flows from the scavenge air receiver through a row of scavenge air ports 6 in the lower end of a cylinder 7 and upwards through the cylinder in a swirling motion and up towards the upper portion of the cylinder, while at the same time pressing out hot combustion gasses via the open exhaust valve and into the exhaust gas receiver 8. The flow of hot combustion gasses past the valve seats of the exhaust valve can occur at high gas speeds, in particular when the valve opens and closes.

The exhaust valve 1 is mounted in an exhaust valve housing 9 that is fixed to a cylinder cover 10 at the top of the cylinder. In the closed position of the exhaust valve, a valve seat area 11 on the upper side of a valve disc 12 abuts a corresponding valve seat on a stationary part 13, also called the bottom piece, of the valve housing.

The valve disc has a first side 14 facing upwards towards exhaust channel 15 and a second side 16 facing downwards to combustion chamber 17 in the cylinder 7. A valve stem 18 extends centrally from the first side 14 and has a portion 19 for mounting of valve rotator wings, a bearing area 20 for positioning in a stationary valve guide in the valve housing, a groove 21 for mounting of an air spring piston or a spring end support, and an upper end area 22 for mounting at an actuator piston in a hydraulic valve actuator. The upper end of the stem may alternatively be actuated by a cam in a traditional manner.

Figure 2:
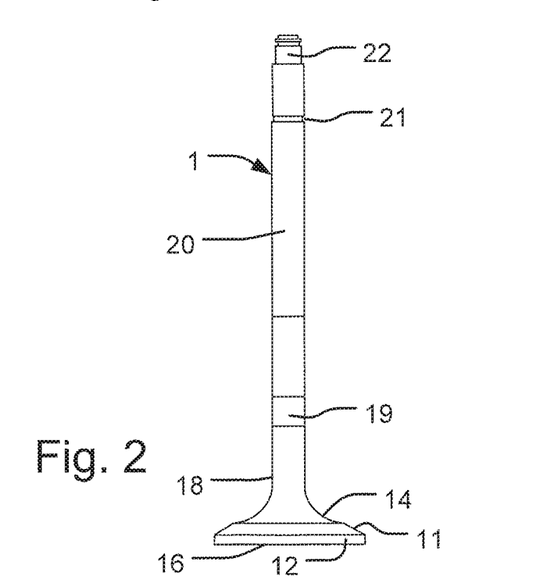
FIG. 2 depicts an exhaust valve according to the present invention.

The stationary part 13 can be cooled by water. In the mounted position of the exhaust valve, the stem 18 extends upwards from the valve disc and passes the exhaust channel and continues upwards through the valve guide and up into an exhaust valve actuator. A piston of a pneumatic spring is mounted to the outside of the stem. A hydraulic actuator piston at the top of the stem can activate the exhaust valve for downward movement, and the pneumatic spring acts in the opposite direction and closes the exhaust valve when the pressure in the hydraulic actuator is relieved. The embodiment illustrated in FIG. 2 is an exhaust valve for an engine of one of the types ME or MC of applicant's brand. The exhaust valve could also be mechanically actuated in well-known manner, and a mechanical return spring could also be used. The portion of the stem located in the exhaust channel is provided with oblique fins extending out radially from the stem. These fins cause the exhaust valve to rotate some degrees in the circumferential direction when the exhaust gas is flowing out. In another embodiment the stem does not have such fins.

The exhaust valve can be for a four-stroke internal combustion engine, or it can be for a two-stroke internal combustion engine, preferably a large two-stroke crosshead engine, which may have cylinder diameters ranging from 250 to 1100 mm. The outer diameter of the valve disc 12 is in the range from 100 mm to 600 mm, depending on the cylinder bore, when the valve is for such large two-stroke engines. The internal combustion engine utilizing the exhaust valve spindles may be of the make MAN Diesel & Turbo, such as of the type MC or ME, or may be of the make Wartsila or Sulzer Diesel, such as of the type RTA of RTA-flex, or may be of the make Mitsubishi. When the exhaust valve is for a four-stroke engine the outer diameter of the valve disc 12 is typically in the range from 50 mm to 300 mm.

Figure 3:
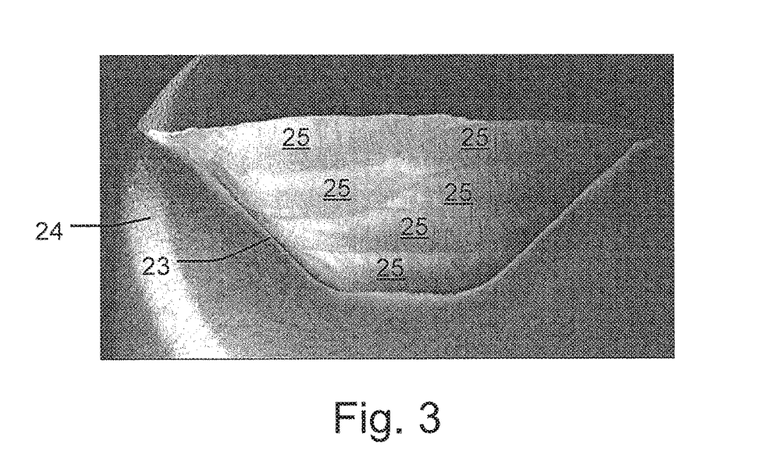
FIG. 3 is a cross sectional view of a valve seat raw area.
Figure 5:
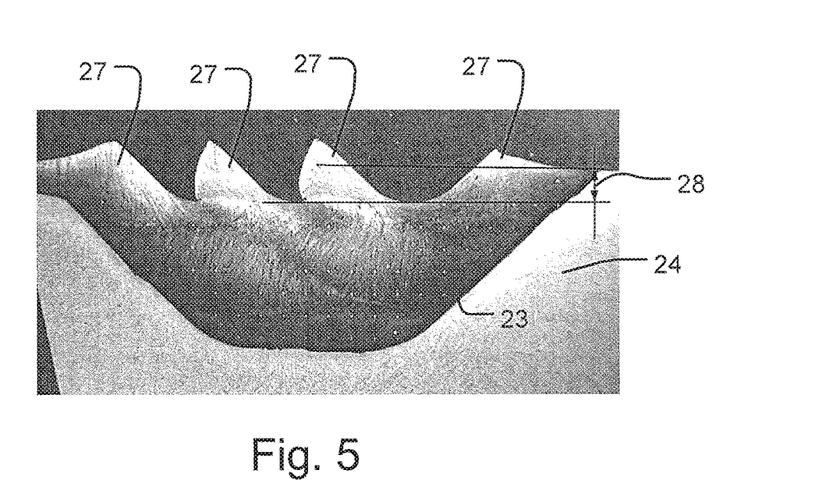
FIG. 5 is a cross sectional view through the valve seat raw area after applying the prior art rolling method of FIG. 4.

Valve seat area 11 is in general annular and conical and located next to an outer end portion of the valve disc. The valve seat area can be of the same alloy as the remainder of the exhaust valve, or it can be of a different alloy deposited in a groove 23 on a base body 24, as illustrated in FIG. 3. In FIG. 3 groove 23 is filled with six weld seams 25. It is known to plastically deform such a deposited valve seat area by use of a rolling tool 26 having a roll with a V-shape outer surface. The V-shape is pressed into the material of the valve seat in several rounds at different diameters from the central axis of the exhaust valve. After rolling the cross sectional shape of the valve seat area is as depicted in FIG. 5. The rolling presses material sideways of the roll so that ridges 27 are formed. The rolling depth 28 below the outer surface of the raw seat represents excess material that must be removed after rolling, such as by machining on a lathe.

Figure 4:
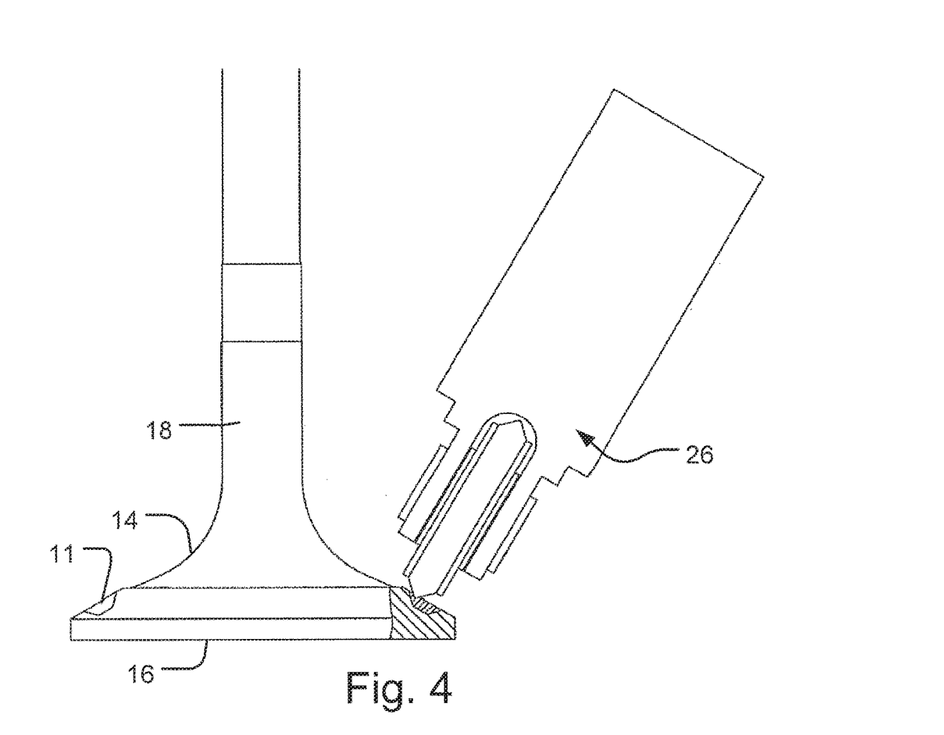
FIG. 4 illustrates a prior art rolling method for a valve seat area.
Figure 6:
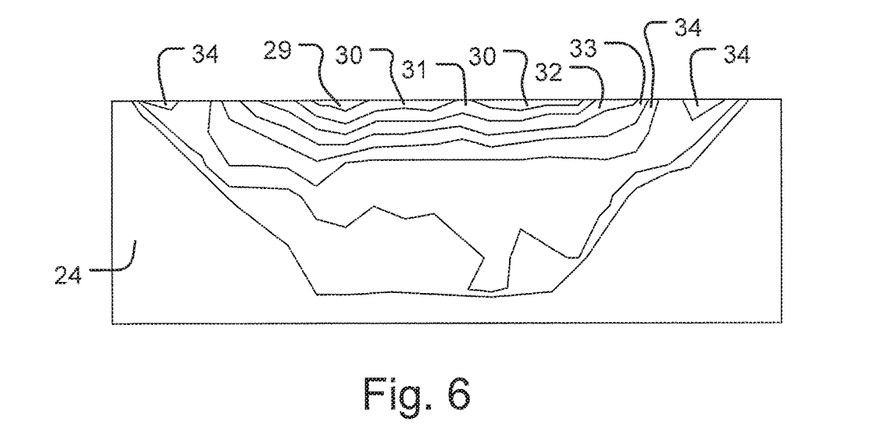
FIG. 6 illustrates the hardness distribution in the completed valve seat area manufactured with the prior art rolling method of FIG. 4.

A reference sample was manufactured of an Inconel 718 valve seat alloy welded onto a stainless steel base body. Rolling was performed as illustrated in FIG. 4 with the results as presented in FIG. 5. The excess material was removed by turning on a lathe. The valve disc was subjected to age hardening. The hardness of the resulting valve seat area is illustrated in FIG. 6. The following hardness values have been achieved: areas marked 29 hardness 575 HV; areas marked 30 hardness 550 HV; areas marked 31 hardness 525 HV; areas marked 32 hardness 500 HV; areas marked 33 hardness 475 HV; and areas marked 34 hardness 450 HV.

Figure 7:
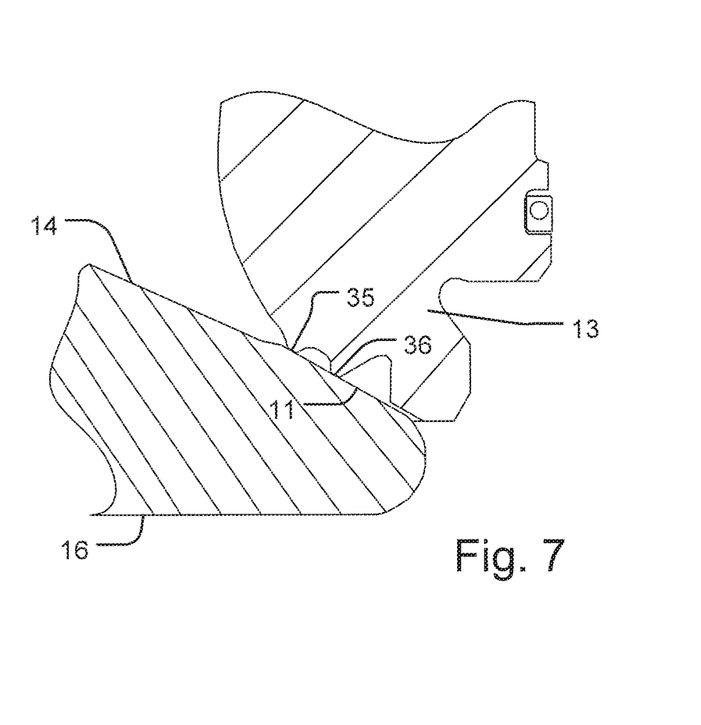
FIG. 7 illustrates a section through an outer area of the exhaust valve disc and a stationary valve housing part.

An example of a stationary valve housing part 13 is illustrated in FIG. 7. A section is shown through an outer area of the exhaust valve disc and a stationary valve housing part having seat surfaces 35, 36 abutting the valve seat area 11 when the exhaust valve is in closed position. Alternatively the stationary valve housing part can have a single seat surface substantially covering the outer surface of the valve seat area.

Figure 9:
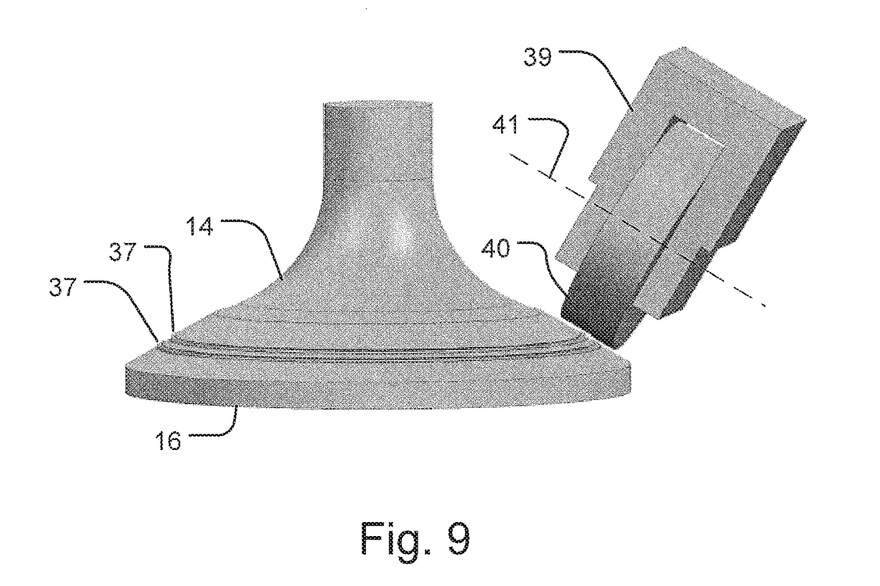
FIG. 9 is an illustration of a rolling tool and a valve disc for the method according to the present invention.

An example of the method of strengthening an annular valve seat area according to the present invention is described in the following. The valve disc 12 with a raw seat area is provided. The raw seat area has two annular protrusions 37 separated by an intermediate annular area 38. The annular protrusions 37 have less width than the intermediate annular area 38. The two annular protrusions 37 are then plastically deformed by rolling with a rolling tool 39 as illustrated in FIG. 9. The rolling tool has a roll 40 which is cylindrically shaped and mounted in the tool so that the roll can rotate about central axis 41, which extends in parallel with the cylindrical outer surface of the roll. During rolling the rolling tool presses the roll against the seat raw area with sufficient force to cause plastic deformation of the annular protrusions. A load of 5 to 10 t on the roll may be suitable for generating the required force for rolling a seat area on a valve disc having an outer diameter of about 0.35 m. During rolling the rolling tool is positioned with central axis 41 in parallel with the outer surface of the valve seat area 11, and the valve disc is fixed on a rotating table. The rotating table rotates the valve disc about the longitudinal axis of the valve and thus the roll 40 rolls on the valve seat area. The rolling tool may also be embodied with two rolls both rotating about axis 41, and the rolling tool may then be positioned so that the one roll is pressing only on one of the annular protrusions, and the other roll is pressing only on the other of the annular protrusions.

Figure 10:
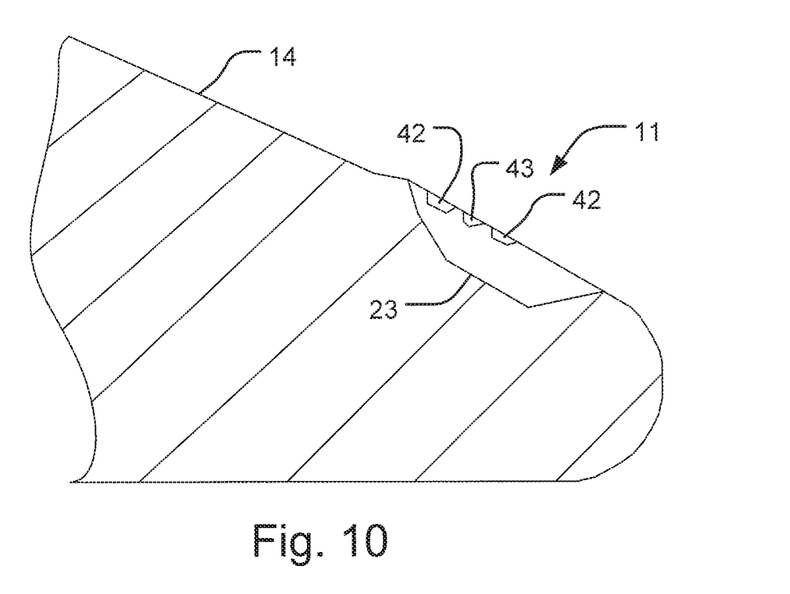
FIG. 10 illustrates a vertical cross section through a valve seat area in according to the present invention.

After completion of the rolling the annular protrusions have been plastically deformed into the valve seat area so that the outer surface of the valve seat area 11 follows a conical surface. The individual annular protrusion 37 has thus been deformed into a second annular portion 42 of the valve seat area, and a first annular portion 43 is located in between the second annular portions 42. The first annular portion 43 has lower hardness than the two second annular portions 42 because the first annular portion has not been subjected to the same amount of plastic deformation as the second annular portions.

Figure 8:
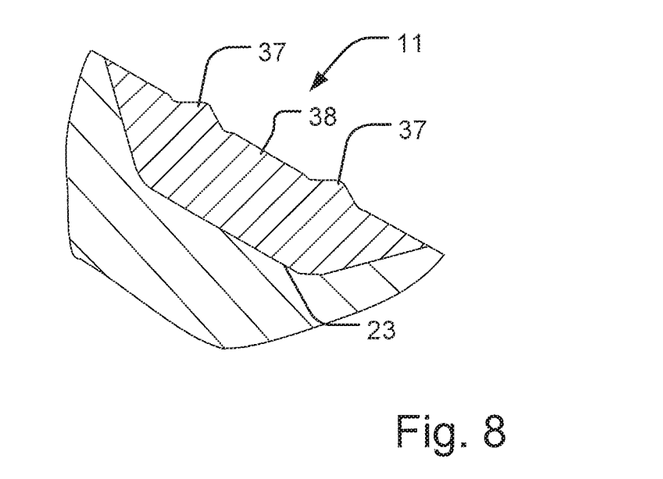
FIG. 8 illustrates a section through a first embodiment of raw seat area having two annular protrusions separated by an intermediate annular area in accordance with the present invention.
Figure 11:
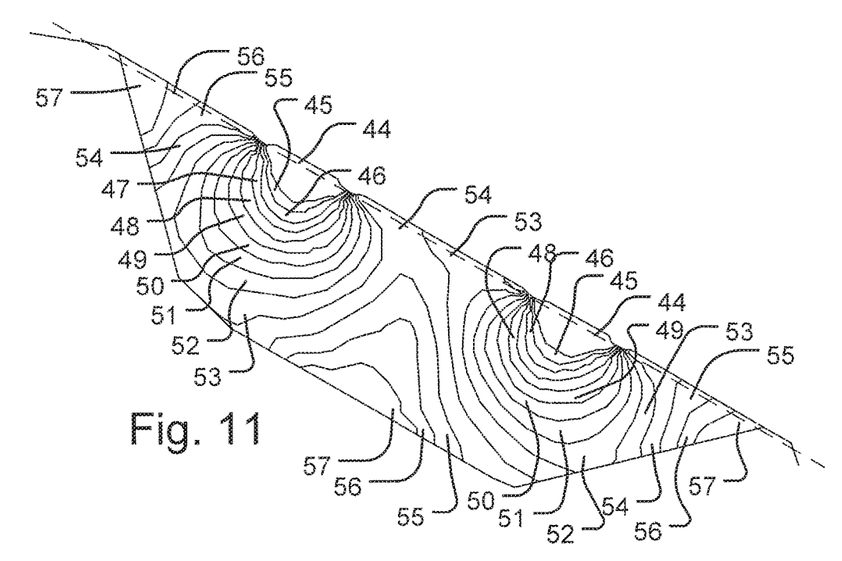
FIG. 11 illustrates the hardness distribution in a rolled valve seat area treated with the method of the present invention.

The hardness distribution in the valve seat area is depicted in FIG. 11 for an example of a valve disc having an outer diameter of 0.35 m and a base body of stainless steel (SNCrW stainless steel) and a valve seat area of alloy Inconel 718 (Inconel is a trade mark of Special Metals Corporation) of 53% nickel+cobalt, 19% chromium, 18% iron, 5.3% niobium, 3% molybdenum, 0.9% titanium, 0.5% aluminium, less than 1% cobalt, less than 0.08% carbon, less than 0.35% manganese, less than 0.35% silicon, less than 0.015% phosphorus, less than 0.015% sulfur, less than 0.006% boron, less than 0.3% copper, and unavoidable impurities. Following deposition of the alloy by welding in the valve seat area, the outer surface was turned in a lathe to the profile illustrated in FIG. 8 where the annular protrusion 37 had a height h of 1.0 mm and an angling of the sides of α=50° and a curved central portion having a radius of curvature of 0.5 mm. The rolling was performed with a loading of 10 t on the rolling tool. After rolling the valve disc was subjected to an aging heat treatment at 720° C. for six hours followed by 620° C. for six hours. As an alternative the aging heat treatment may be performed for 10 hours at 730° C. A piece was cut from the valve seat area and the hardness was measured. The hardness distribution is illustrated in FIG. 11, and the values are given in HV in the following table 1.

TABLE 1

| Reference numeral | Vickers hardness range HV |
|---|---|
| 44 | 450 to 588 |
| 45 | 429 to 450 |
| 46 | 408 to 450 |
| 47 | 387 to 408 |
| 48 | 366 to 387 |
| 49 | 345 to 366 |
| 50 | 325 to 345 |
| 51 | 304 to 325 |
| 52 | 283 to 304 |
| 53 | 262 to 283 |
| 54 | 241 to 262 |
| 55 | 220 to 241 |
| 56 | 200 to 220 |
| 57 | below 200 |

The area of highest hardness of 588 HV was located at the middle of the second annular portion at about 0.3 mm below the outer surface. In order to complete the valve seat area, the outermost material is removed to a depth of 0.2 mm as indicated by the broken line in FIG. 11.

Figure 12:
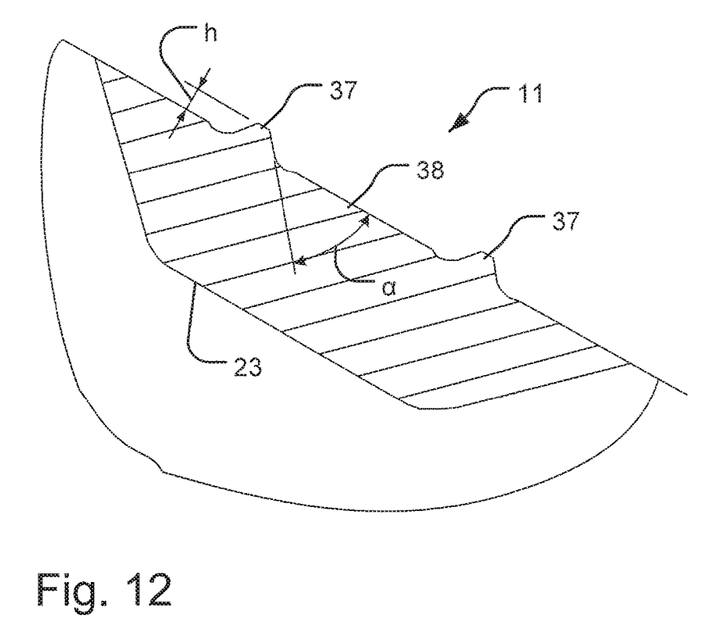
FIG. 12 illustrates a section corresponding to FIG. 8 through a second embodiment of raw seat area in accordance with the present invention.

The annular protrusions 37 in the raw seat area on valve disc 12 may have other configurations, such as the one illustrated in FIG. 12 where the central portion of the protrusion 37 is flat. Hardness distributions in the valve seat area have been found for some different embodiments of the protrusions. The height h of the protrusion and the angle α for the sides of the protrusion are illustrated in FIG. 12.

Examples having an angling of the sides of a=30° and a curved central portion having a radius of curvature of 1.0 mm were made having the heights h of 0.8 mm, 1.0 mm and 1.5 mm. The protrusion having a height of 0.8 mm provided a hardness of 504 HV and a slightly lower hardness of about 450 HV at the middle of the surface of the second annular portion. The protrusion having a height of 1.0 mm provided a hardness of 502 HV and a slightly lower hardness of about 475 HV at the middle of the surface of the second annular portion. The protrusion having a height of 1.5 mm provided a hardness of 503 HV and a quite even hardness across the width of the surface of the second annular portion. Examples having an angling of the sides of α=50° and a curved central portion having a radius of curvature of 1.0 mm were made having the heights h of 1.0 mm, 1.5 mm and 2.0 mm. The protrusion having a height of 1.0 mm provided a hardness of 575 HV and a slightly lower hardness of about 450 HV at the middle of the surface of the second annular portion. The protrusion having a height of 1.5 mm provided a hardness of 599 HV and a quite even hardness of about 500 HV across the width of the surface of the second annular portion. The protrusion having a height of 2.0 mm provided a hardness of 619 HV and a quite even hardness of about 520 HV across the width of the surface of the second annular portion. Two examples having a flat central portion of a width of 0.5 mm and a height of 1.0 mm were made with anglings of the sides of α=50° and 60°. The example having α=50° provided a hardness of 588 HV and a quite even hardness of about 525 HV across the width of the surface of the second annular portion. The example having α=60° provided a hardness of 619 HV and a quite even hardness of about 530 HV across the width of the surface of the second annular portion.

In all examples the hardness of the first annular portion was much lower than the hardness of the second annular portions. The hardness of the first annular portion was generally in the range from 200 HV to 300 HV, and in most examples the hardness of the first annular portion was generally in the range from 200 HV to 260 HV. As the ductility of the alloy material increases when the hardness decreases, the first annular portion is thus providing the valve seat area with a significantly increased ductility. If the stationary valve housing part has two seat surfaces 35, 36 the second annular portions 37 are preferably located so as to abut seat surfaces 35, 36 when the valve is in closed position. If the stationary valve housing part has a single, wide seat surface the second annular portions 37 are preferably located so as to both abut this seat surface when the valve is in closed position. It is preferred that the average hardness at the valve seat surface at the middle of the first annular portion is at least 80 HV lower than the average hardness at the middle of the surface of at least one of the second annular portions. This average hardness is found by measuring the hardness at least at five positions distributed along the circle located at the middle of the surface of the portions, and then finding the average of the measured values. The difference in average hardness may be only 50 HV or may be larger than 80 HV, such as 150 HV, 250 HV or 300 HV. In most of the above-mentioned examples the hardness of the first annular portion was generally in the range from 200 HV to 260 HV, and the hardness of the second annular portions was generally higher than 460 HV, which makes the difference at least 200 HV. Other alloys than Inconel 718 may be used as the alloy of the valve seat area. The valve seat area can be of a nickel-based alloy, which alloy stated in percent-by-weight and apart from common impurities and inevitable residual amounts of deoxidizing components comprises at least from 34.0 to 44.0% Cr, an aggregate amount of Nb and Ta in the range from at least 2.8 to 6.1%, from 0.3 to 2.0% Ti, a balance of Ni, and optionally one or more of the components at the most 0.2% Al, at the most 0.04% B, at the most 0.8% Fe, at the most 0.04% C, and at the most 0.4% Si. As a further example the valve seat area can be of a nickel-based alloy comprising at least the components 10-25% Cr, 5-25% Co, 2-23% Ta, a balance of Ni, and optionally one or more of the components up to 10% Mo+W, up to 11% Nb, up to 4% Ti, up to 3% Al, up to 0.3% C, up to 1% Si, up to 0.015% S, up to 5% Fe, and up to 3% Mn. As a further example the valve seat area can be of a nickel-based alloy comprising at least the components 20-23% Cr, 8-10% Mo, 3.15-4.15% Ta+Nb, a balance of at least 58% Ni, and optionally one or more of the components up to 5% Fe, up to 0.1% C, up to 0.5% Mn, up to 0.5% Si, up to 0.4% Al, up to 0.4% Ti, up to 1.0% Co, up to 0.015% Si, and up to 0.015% P. As a further example the valve seat area can be of a nickel-based alloy comprising at least the components 27-30% Cr, 7-11% Fe, up to 0.05% C, optionally small amounts of Mg, Co, Si and a balance of at least 58% Ni. As a further example the valve seat area can be of an alloy comprising at least the components 10-25% Cr, 3-12% Nb and/or Ta, 5-25% Fe, and a balance of nickel and/or cobalt. As a further example the valve seat area can be of an alloy comprising at least the components 0.04-0.08% C, 46-49% Cr, 0.3-0.5% Ti, and a balance of Ni. As a further example the entire valve disc, and thus also the valve seat area can be of the alloy Nimonic 80A (Nimonic is a trade mark of Special Metals Corporation) comprising at least the components 18-21% Cr, 1.8-2.7% Ti, 1.0-1.8% Al, at the most 3.0% Fe, at the most 2.0% Co, and as balance Ni.

When the valve disc comprises a base material of stainless steel it can be a stainless steel, such as an alloy having 0.25% C, 1.4% Si, 1.3% Mn, 20% Cr, 9% Ni, 3% W, and the balance Fe. Other stainless steels can also be used and are well-known in the art of exhaust valves.

In an embodiment the valve disc 12 comprises at its second side a layer of a hot corrosion resistant material, such as a layer of a nickel-based alloy comprising at least the components 20-23% Cr, 8-10% Mo, 3.15-4.15% Ta+Nb, a balance of at least 58% Ni, and optionally one or more of the components up to 5% Fe, up to 0.1% C, up to 0.5% Mn, up to 0.5% Si, up to 0.4% Al, up to 0.4% Ti, up to 1.0% Co, up to 0.015% Si, and up to 0.015% P.

In embodiments where the valve seat area is of an alloy different from the alloy of the base body of the exhaust valve, the valve seat area can be deposited in a groove 23 on a base body 24 by welding with several weld seams. The welding can be performed by plasma welding, laser welding, gas metal arc welding or gas tungsten arc welding. The valve seat area can alternatively be deposited by processes like cold-spraying or HIP. In embodiments having a layer of a hot corrosion material on the second side of the valve disc, the mentioned processes can likewise be applied to deposit the layer.

Details of the above-mentioned embodiments and examples may be combined into further embodiments and examples within the scope of the patent claims.

The invention claimed is:

1. A method of strengthening an annular valve seat area in an exhaust valve for an internal combustion engine, which exhaust valve comprises a valve disc having a first side and a second side, a valve stem extending from the first side of the valve disc, and the annular valve seat area located at the first side of the valve disc, the annular valve seat area being a nickel-base alloy or a chromium-base alloy, wherein at least the following steps are performed:
   a) providing a valve disc with a raw seat area that has at least two annular protrusions separated by an intermediate annular area,
   b) plastically deforming the two annular protrusions,
   c) machining the raw seat area to the dimensions of the annular valve seat area, and
   d) heat treating the valve disc with the annular valve seat area with a heat treatment including at least an aging heat treatment.

2. A method of strengthening an annular valve seat area in an exhaust valve according to claim 1, wherein the plastic deformation in step b) includes rolling with a cylindrically shaped roll.

3. A method of strengthening an annular valve seat area in an exhaust valve according to claim 2, wherein a separate cylindrically shaped roll is provided for each annular protrusion.

4. A method of strengthening an annular valve seat area in an exhaust valve according to claim 3, wherein the separate cylindrically shaped rolls are carried by a common rolling tool, but are allowed to rotate during rolling with mutually different rotational speeds.

5. A method of strengthening an annular valve seat area in an exhaust valve according to claim 1, wherein the individual annular protrusion provided in step a) has a curved central portion.

\* \* \* \* \*